(12) United States Patent
Goodwin

(10) Patent No.: US 10,214,819 B2
(45) Date of Patent: Feb. 26, 2019

(54) GALVANIC ANODE AND METHOD OF CORROSION PROTECTION

(71) Applicant: Construction Research & Technology, GmbH, Trostberg (DE)

(72) Inventor: Frederick R Goodwin, Solon, OH (US)

(73) Assignee: Construction Research & Technology GmbH, Trostberg (DE)

( * ) Notice: Subject to any disclaimer, the term of this patent is extended or adjusted under 35 U.S.C. 154(b) by 219 days.

(21) Appl. No.: 14/418,044

(22) PCT Filed: Jul. 30, 2013

(86) PCT No.: PCT/EP2013/065990
§ 371 (c)(1),
(2) Date: Jan. 28, 2015

(87) PCT Pub. No.: WO2014/020017
PCT Pub. Date: Feb. 6, 2014

(65) Prior Publication Data
US 2015/0159282 A1    Jun. 11, 2015

Related U.S. Application Data

(60) Provisional application No. 61/677,164, filed on Jul. 30, 2012, provisional application No. 61/740,962, filed on Dec. 21, 2012.

(51) Int. Cl.
*C23F 13/02* (2006.01)
*C23F 13/16* (2006.01)
(Continued)

(52) U.S. Cl.
CPC .............. *C23F 13/16* (2013.01); *C23F 13/06* (2013.01); *C23F 13/10* (2013.01); *C23F 13/18* (2013.01);
(Continued)

(58) Field of Classification Search
CPC .......... C23F 13/02; C23F 13/06; C23F 13/08; C23F 13/10; C23F 13/14; C23F 13/16;
(Continued)

(56) References Cited

U.S. PATENT DOCUMENTS

| 3,441,491 | A | * | 4/1969 | George | C23F 13/06 |
| | | | | | 204/196.15 |
| 5,449,563 | A | * | 9/1995 | Zhang | C23F 13/10 |
| | | | | | 228/262.44 |

(Continued)

FOREIGN PATENT DOCUMENTS

| CN | 201 372 311 Y | 12/2009 |
| GB | 1 379 832 A | 1/1975 |

(Continued)

OTHER PUBLICATIONS

PCT/EP2013/065990—International Search Report, dated Dec. 17, 2013.

(Continued)

*Primary Examiner* — Alexander W Keeling
(74) *Attorney, Agent, or Firm* — Curatolo Sidoti Co., LPA; Joseph G. Curatolo; Salvatore A. Sidoti

(57) ABSTRACT

A sacrificial galvanic anode, an anodic assembly including the sacrificial anode, and a method of cathodically protecting steel reinforcement in concrete structures from corrosion is provided. The sacrificial galvanic anode comprises at least one sacrificial metal helical coil. The galvanic anode is easily fabricated and occupies a minimum volume within a steel reinforced concrete structure while providing maximum surface area for sacrificial corrosion.

36 Claims, 10 Drawing Sheets

(51) Int. Cl.
*C23F 13/06* (2006.01)
*C23F 13/10* (2006.01)
*C23F 13/18* (2006.01)
*C23F 13/20* (2006.01)
*C04B 111/26* (2006.01)

(52) U.S. Cl.
CPC ......... *C23F 13/20* (2013.01); *C04B 2111/265* (2013.01); *C23F 2201/02* (2013.01); *C23F 2213/22* (2013.01)

(58) Field of Classification Search
CPC ...... C23F 13/18; C23F 13/20; C23F 2201/02; C23F 2213/20; C23F 2213/21; C04B 2111/26–2111/265
See application file for complete search history.

(56) References Cited

U.S. PATENT DOCUMENTS

| | | | |
|---|---|---|---|
| 5,968,339 | A | 10/1999 | Clear |
| 6,193,857 | B1 | 2/2001 | Davison et al. |
| 6,303,017 | B1 | 10/2001 | Page et al. |
| 6,461,082 | B1 | 10/2002 | Smith |
| 7,402,233 | B1 | 7/2008 | Morgan |
| 2008/0105564 | A1* | 5/2008 | Glass ............... C23F 13/06 205/734 |
| 2008/0230398 | A1* | 9/2008 | Glass ............... C23F 13/02 205/734 |
| 2010/0044218 | A1 | 2/2010 | Funahashi |
| 2010/0270169 | A1 | 10/2010 | Howard et al. |

FOREIGN PATENT DOCUMENTS

| | | |
|---|---|---|
| JP | 2002220685 A | 8/2002 |
| WO | WO 95/32320 | 11/1995 |
| WO | WO 02/16670 A2 | 2/2002 |

OTHER PUBLICATIONS

PCT/EP2013/065990—International Written Opinion, dated Dec. 17, 2013.
PCT/EP2013/065990—International Preliminary Report on Patentability, dated Feb. 3, 2015.
PCT/EP2013/065179—International Search Report, dated Dec. 19, 2013.
PCT/EP2013/065179—International Written Opinion, dated Dec. 19, 2013.
PCT/EP2013/065179—International Preliminary Report on Patentability, dated Feb. 3, 2015.
Canadian Patent Application No. 2,880,235—Office Action dated Jun. 10, 2016.
Office Action in Russian Patent Application 2015 103 986.
Office Action in Australian Patent Application 2013298658, dated Sep. 11, 2017.
Office Action in Australian Patent Application 2013298781, dated Oct. 4, 2017.
Office Action for Japanese Patent Application No. 2015-524710, dated Sep. 19, 2017.

* cited by examiner

GALVANIC ANODE AND METHOD OF CORROSION PROTECTION

CROSS REFERENCE TO RELATED APPLICATIONS

This application is a national stage application of International Application No. PCT/EP2013/065990, filed 30 Jul. 2013, which claims priority from U.S. Provisional Patent Application Nos. 61/677,164, filed 30 Jul. 2012 and 61/740,962, filed 21 Dec. 2012, from which applications priority is claimed, and which are incorporated herein by reference.

BACKGROUND

Corrosion is a naturally occurring phenomenon commonly defined as the deterioration of a substance (usually a metal) or its properties as a result of a reaction with its environment. Like other natural hazards such as earthquakes or severe weather disturbances, corrosion can cause dangerous and expensive damage to everything from vehicles and home appliances to wastewater systems, pipelines, bridges, roadways and public buildings. Unlike weather-related disasters, however, there are time-proven methods to prevent and control corrosion that can reduce or eliminate its impact on public safety, the economy, and the environment.

The 2001 U.S. Federal Highway Administration-funded cost of corrosion study, "Corrosion Costs and Preventive Strategies in the United States," determined the annual direct cost of corrosion to be a staggering $276 billion. The study covered a large number of economic sectors, including the transportation infrastructure, electric power industry, conveyance and storage.

The indirect cost of corrosion was conservatively estimated to be equal to the direct cost, giving a total direct plus indirect cost of more than $600 billion or 6 percent of GDP. This cost is considered to be a conservative estimate since only well-documented costs were used in the study. In addition to causing severe damage and threats to public safety, corrosion disrupts operations and requires extensive repair and replacement of failed assets.

The U.S. Federal Highway Administration has rated almost 200,000 bridges, or one of every three bridges in the U.S., as structurally deficient or functionally obsolete. Furthermore, more than one-fourth of all bridges are over 50 years old, the average design-life of a bridge.

The road and bridge infrastructure in the United States is crumbling, with thousands of bridges rated as unsafe and in need of replacement or major repairs. In many of these cases, corrosion plays a significant role in undermining safety. Corrosion protection measures could help minimize or avoid further problems. Steps are being taken to address America's aging infrastructure. For example, House bill H.R. 1682, the "Bridge Life Extension Act 2009," introduced in March 2009, would require States to submit a plan for the prevention and mitigation of damage caused by corrosion when seeking federal funds to build a new bridge or rehabilitate an existing bridge.

Many reinforced concrete structures suffer from premature degradation. Concrete embedded steel reinforcement is initially protected from corrosion by the development of a stable oxide film on its surface. This film, or passivation layer, is formed by a chemical reaction between the highly alkaline concrete pore water and the steel. The passivity provided by the alkaline conditions may be destroyed by the presence of chloride. The chloride ions locally de-passivate the metal and promote active metal dissolution. Corrosion of the steel is usually negligible until the chloride ions reach a concentration where corrosion initiates. The threshold concentration depends on a number of factors including, for example, the steel microenvironment, the pore solution pH, the interference from other ions in the pore solution, the electrical potential of the reinforcing steel, the oxygen concentration and ionic mobility. The chloride acts as a catalyst in that it does not get consumed in the corrosion reaction but remains active to again participate in the corrosion reaction.

Damage to reinforced concrete structures is caused primarily by the permeation of chloride ions through the concrete to the area surrounding the steel reinforcement. There are a number of sources of chlorides including additions to the concrete mix, such as chloride-containing accelerating admixtures. The chloride may also be present in the structure's environment such as marine conditions or de-icing salts. The presence of chloride does not have a directly adverse effect on the concrete itself, but does promote corrosion of the steel reinforcement. The corrosion products that form on the steel reinforcement occupy more space than the steel reinforcement causing pressure to be exerted on the concrete from within. This internal pressure builds over time and eventually leads to cracking and spalling of the concrete. Corrosion of the steel reinforcement also reduces the strength of the reinforcing steel and diminishes the load bearing capacity of the concrete structure.

Other factors besides chloride ion concentration affect the corrosion rate of steel, including pH, oxygen availability, and electrical potential of the steel, as well as resistivity of the surrounding concrete. These factors interact, such that a limitation on one does not necessarily prevent corrosion and levels approaching threshold levels of one will synergize with another to allow corrosion. For example, even with a high chloride level if insufficient oxygen is available, corrosion will not occur. As the pH falls, the chloride threshold for corrosion becomes lower. In very high resistivity concrete, not only does carbonation and chloride ingress slow, the corrosion reaction is reduced due to the increased difficulty of ion flow. Temperature is also involved in corrosion activity, just like any other chemical reaction.

Cathodic protection of steel reinforcement in concrete is an accepted method of providing corrosion protection for the metal, especially where chloride ions are present at significant concentrations in the concrete. Cathodic protection involves the formation of a circuit with the reinforcing steel acting as a cathode that is electrically connected to an anode. When a sufficiently large potential difference exists, corrosion of the cathode is reduced or prevented.

It is known to create a potential difference between an anode and a cathode both by means of impressed current cathodic protection and by means of a galvanic cell. Impressed current cathodic protection involves the use of an anode and an applied electrical current employing an external DC power supply or an AC power source and a rectifier. The power supply presents challenges in terms of reliability and costs associated with ongoing power consumption, monitoring, control, and maintenance requirements.

Control of the current for impressed current cathodic protection systems is a huge challenge. The amount of energy supplied, whether constant current or voltage ICCP, changes as the temperature, moisture content, chloride exposure, and pH change and must be adjusted through different zones to prevent overprotection (hydrogen embrittlement, acid formation, etc . . . ) or underprotection (corrosion).

Cathodic protection may also be provided by means of a galvanic cell in which the potential arises as a result of different materials forming a sacrificial anode and a cathode. Sacrificial cathodic protection occurs when a metal is coupled to a more reactive, or more anodic, metal. The anode consists of a sacrificial metal that is capable of providing protective current without the use of a power supply, since the reactions that take place during their use are thermodynamically favored. Disadvantages of sacrificial anode systems include limited available protection current and limited life. Sacrificial anodes are subject to ongoing corrosion, or consumption of the galvanic metal, and generally require replacement at some point depending on the extent of the corrosion.

Because corrosion of steel-reinforced concrete structures presents dangers to human life and is very costly to repair, what is needed are improved systems and methods for meeting the need to implement new anti-corrosion technologies and protect infrastructure for future generations.

Figure 1:
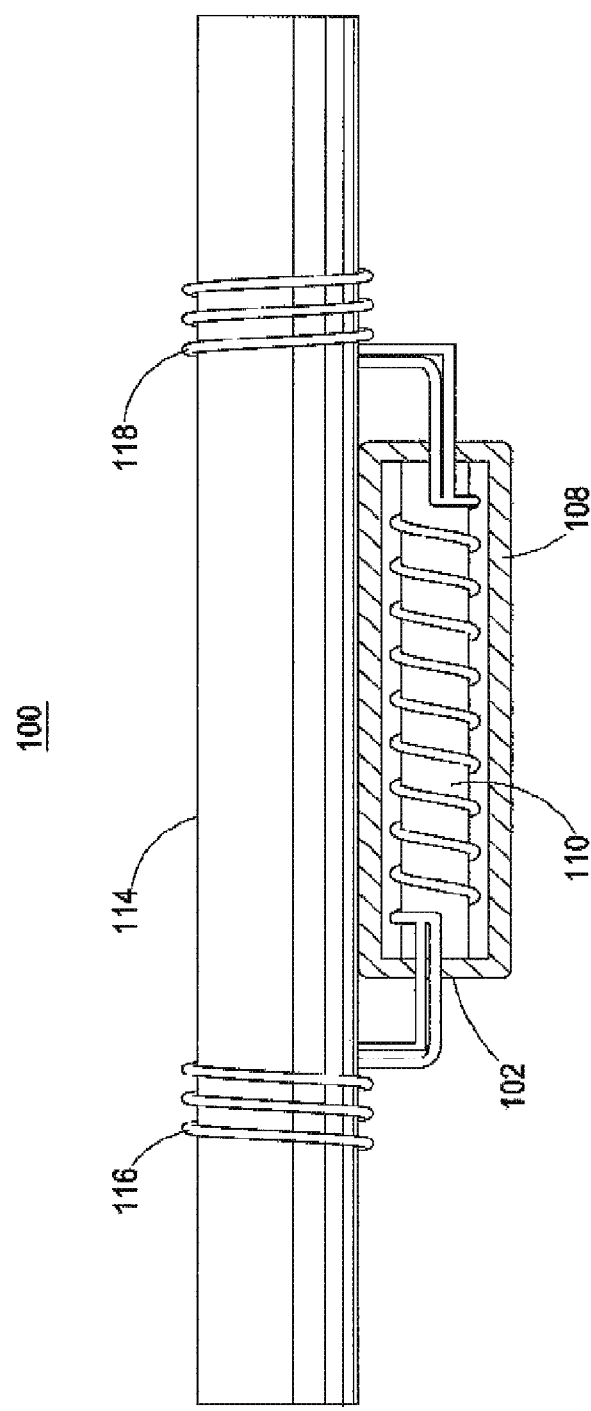
FIG. 1 is a cross sectional view of an illustrative embodiment of the galvanic cathodic protection system.

It should be noted that the gaps in the graphs represent depolarizations-disconnection of the anode and cathode to determine amount of polarization and if the anode system returns to function after some time being disconnected.

DETAILED DESCRIPTION

Provided is a galvanic anode, a galvanic anode system and a method for the cathodic protection of reinforcing steel in a steel-reinforced concrete structure. According to certain illustrative embodiments, the sacrificial anode body comprises (a) at least one helical coil comprising a sacrificial metal having a longitudinal axis and, (b) at least one elongated electrical conductor electrically connected to the helical coil, and (c) an encasement material surrounding at least a portion of the helical coil and a portion of the at least one elongated electrical conductor, wherein a portion of the at least one elongated electrical conductor emanates from the encasement material.

According to certain illustrative embodiments, the sacrificial anode body comprises (a) at least one helical coil comprising a sacrificial metal having a longitudinal axis and, (b) at least one elongated electrical conductor electrically connected to the helical coil, and (c) an encasement material surrounding at least a portion of the helical coil.

According to other embodiments, a sacrificial anode body comprises (a) a helical coil comprising a first sacrificial metal and a longitudinal axis and, (b) a second sacrificial metal, said second sacrificial metal less electrochemically active than the first sacrificial metal, wherein said first sacrificial metal and the second sacrificial metal are more electrochemically active than steel, (c) at least one elongated electrical conductor electrically connected to at least one of the first and second sacrificial metals, and (d) an encasement material surrounding sat least a portion of said first and second sacrificial metals and a portion of the at least one elongated electrical conductor, wherein a portion of said at least one elongated electrical conductor emanates from the encasement material.

According to other embodiments, a sacrificial anode body comprises (a) a helical coil comprising a first sacrificial metal and a longitudinal axis and, (b) a second sacrificial metal, said second sacrificial metal less electrochemically active than the first sacrificial metal, wherein said first sacrificial metal and the second sacrificial metal are more electrochemically active than steel, (c) at least one elongated electrical conductor electrically connected to at least one of the first and second sacrificial metals, and (d) an encasement material surrounding at least a portion of said first and second sacrificial metals.

According to further embodiments, a system for reducing the corrosion of steel reinforcement in a steel-reinforced concrete structure comprises (a) an anode body comprising at least one helical coil having a longitudinal axis, the helical coil comprising a sacrificial metal more electrochemically active than steel, (b) the at least one helical coil at least partially covered with an encasement material, and (c) at least one electrical conductor electrically connecting the anode body to (d) a reinforcing steel element.

According to further embodiments, the system for reducing the corrosion of steel reinforcement in a steel-reinforced concrete structure comprises (a) an anode body comprising at least one helical coil having a longitudinal axis, the helical coil comprising a sacrificial metal more electrochemically active than steel, (b) at least one electrical conductor electrically connected to the anode body, (c) the at least one helical coil and the at least one electrical conductor at least partially covered with an encasement material, and (d) the at least one electrical conductor electrically connecting the at least one helical coil to a reinforcing steel element located in the concrete structure.

According to further embodiments, the system for reducing the corrosion of steel reinforcement in a steel-reinforced concrete structure comprises (a) a helical coil comprising a first sacrificial metal and a longitudinal axis and, (b) a second sacrificial metal, said second sacrificial metal less electrochemically active than the first sacrificial metal, wherein said first sacrificial metal and the second sacrificial metal are more electrochemically active than steel, (c) at least one elongated electrical conductor electrically connected to at least one of the first and second sacrificial metals, and (d) an encasement material surrounding at least a portion of said first and second sacrificial metals.

According to further embodiments, the system for reducing the corrosion of steel reinforcement in a steel-reinforced concrete structure comprises (a) a helical coil comprising a first sacrificial metal and a longitudinal axis and, (b) a second sacrificial metal, said second sacrificial metal less electrochemically active than the first sacrificial metal, wherein said first sacrificial metal and the second sacrificial metal are more electrochemically active than steel, (c) at least one elongated electrical conductor electrically connected to at least one of the first and second sacrificial metals, and (d) an encasement material surrounding at least a portion of said first and second sacrificial metals and at least a portion of the at least one electrical conductor.

According to further illustrative embodiments, a method for reducing the corrosion of steel reinforcement in a steel-reinforced concrete structure comprises electrically connecting a sacrificial anode body comprising at least one helical coil having a longitudinal axis, the helical coil comprising a sacrificial metal, wherein the anode body is at least partially covered in an encasement material, to the steel reinforcement in a steel reinforced concrete structure.

According to further illustrative embodiments, a method for reducing the corrosion of steel reinforcement in a steel-reinforced concrete structure comprises electrically connecting a sacrificial anode body comprising (a) a helical coil comprising a first sacrificial metal and a longitudinal axis and, (b) a second sacrificial metal, said second sacrificial metal less electrochemically active than the first sacrificial metal, wherein said first sacrificial metal and the second sacrificial metal are more electrochemically active than steel, (c) at least one elongated electrical conductor electrically connected to at least one of the first and second sacrificial metals, and (d) an encasement material surrounding at least a portion of said first and second sacrificial metals.

According to further illustrative embodiments, a method for reducing the corrosion of steel reinforcement in a steel-reinforced concrete structure comprises electrically connecting a sacrificial anode body comprising (a) a helical coil comprising a first sacrificial metal and a longitudinal axis and, (b) a second sacrificial metal, said second sacrificial metal less electrochemically active than the first sacrificial metal, wherein said first sacrificial metal and the second sacrificial metal are more electrochemically active than steel, (c) at least one elongated electrical conductor electrically connected to at least one of the first and second sacrificial metals, and (d) an encasement material surrounding at least a portion of said first and second sacrificial metals and at least a portion of the at least one electrical conductor.

According to certain embodiments, the anode body includes a first sacrificial metal and a second sacrificial metal, where both the first and the second sacrificial metals are more electrochemically active than the steel reinforcement embedded in the concrete structure. The first sacrificial metal is more electrochemically active as compared to the second sacrificial metal. The oxidation product buildup from the more electrochemically active first metal (if not absorbed or soluble) may further enhance the charge distribution of the corrosion of the second less electrochemically active metal by further insulating the direct conduction path of the second metal to the steel ionic path in a manner similar to the insulating layer or spacer. Thus, the magnesium oxidation products may tend to increase the overall effectiveness of the insulating spacer. The expansive products from the magnesium oxidation also can be relieved between the reinforcing steel and the anode into the compressible adhesive of the insulating spacer rather than generating expansive forces that could result in cracking of the surrounding repair mortar or concrete structure.

Cathodic protection may be applied to control corrosion of steel embedded in reinforced concrete structure. The cathodic protection system of the present disclosure operates to form an electrolytic potential difference between an anode and the steel reinforcement. This difference causes current to flow through an electrical connection and ions to flow through the concrete and/or encasement material sufficient to prevent or reduce corrosion of the steel reinforcement while causing corrosion of the anode.

Cathodic protection prevents corrosion of steel reinforcement in concrete by converting the anodic, or active, sites on the metal surface to cathodic, or passive sites.

Sacrificial cathodic protection may be provided by means of a galvanic cell in which the potential arises as a result of the different materials forming a sacrificial anode and a cathode. The anode body is formed from a sacrificial material which corrodes instead of the steel material without requiring an impressed current. This is referred to as a sacrificial system, since the galvanic anode is sacrificed to protect the structural steel from corrosion. The sacrificial anode comprises a piece of corrodible, or sacrificial metal, electrically connected to the metallic surface to be protected, which is preferentially consumed by electrolytic action.

According to certain embodiments, the sacrificial anode assembly of the present disclosure provides locations for anodic reactions to take place rather than the reinforcing steel. Therefore, while the galvanic system is in service, the anode, instead of the reinforcing steel, will degrade.

According to aspects of the present disclosure, a galvanic system is provided in which the anode body is formed from at least one helical coil, that has a longitudinal axis, and is comprised of a sacrificial metal. The sacrificial metal corrodes instead of the steel, without the provision or use of an impressed current. The anode body may be at least partially covered by an encasement material. Elongated metal conductors are electrically connected to the anode body and emanate from the encasement material to electrically connect the anode body to the reinforcing steel that is embedded in the concrete.

The present disclosure overcomes the disadvantages of known embedded galvanic anodes which are bulky and occupy a comparatively large amount of space in concrete repair applications. In an effort to minimize the repair space required in tightly congested steel reinforced concrete, many known galvanic anodes reduce the amount of sacrificial metal in the anode. Reducing the amount of sacrificial metal decreases the surface area of the sacrificial anode thereby limiting the effectiveness of the anode.

The anode body comprising a sacrificial metal helical coil of the present disclosure satisfies the competing goals of providing an effective amount of sacrificial metal and maintaining a smaller repair volume by providing an increased surface area. The present galvanic anode occupies a minimum volume within a steel reinforced concrete structure while offering a maximum surface area for sacrificial corrosion to produce high galvanic activity and robust performance when embedded.

According to certain illustrative embodiments of the anode body, the amount of sacrificial metal present in a given volume may be increased by, for example, decreasing the spacing between individual loops of the sacrificial metal helical coil or by interleaving two or more coils together. The interleaved helical coils may comprise the same sacrificial metal, for example, zinc or zinc alloys. The interleaved coils may comprise different sacrificial metals, for example, a first helical coil may comprise zinc, or alloys thereof, and a second helical coil may comprise magnesium, or alloys thereof.

In further illustrative embodiments of the anode body, the amount of sacrificial metal present in a given volume may be increased by, for example, including a solid mass of sacrificial metal within a sacrificial metal helical coil or within interleaved sacrificial metal helical coils. In an embodiment, the solid mass of sacrificial metal is appropriately sized to fit within or around the helical coil or coils. The solids mass of sacrificial metal has a length that may be the same as the length of the helical coil, or may be slightly shorter or slightly longer. According to certain embodiments, the solid mass of the second sacrificial metal, such as magnesium, is bent around a portion of the outer surface of the helical coil. As the second sacrificial metal oxidizes, the oxidation product may be absorbed by the spacer which is positioned between the second sacrificial metal and the cathode (ie, the steel reinforcement). The solid mass of sacrificial metal has a width that is slightly smaller than the inner diameter or slightly larger than the outer diameter of the helical coil to permit the solid mass to be positioned within the coil or formed around the outer surface of a portion of the helical coil. The solid mass may comprise the same sacrificial metal as the helical coil or coils or each of the coils and the solid may comprise different sacrificial metals.

At least one elongated electrical conductor electrically connects the anode body to the steel reinforcement in a steel reinforced concrete structure. The elongated electrical conductor may be wound or wrapped around a portion of the longitudinal axis of the anode body providing multiple physical and electrical connection points between the galvanic anode body and the steel reinforcement. For example, a not in limitation, a steel tie wire may be woven or wrapped around the sacrificial metal helical coil and wrapped around the steel reinforcement. The electrical conductor may be wrapped around the helical coil of sacrificial metal along a portion of the length of the helical coil of sacrificial metal. Alternatively, the electrical conductor may be wrapped around the helical coil of sacrificial metal along the entire length of the helical coil. The multiple points of electrical contact provide a secure connection facilitating the production of an even charge distribution, and avoiding corrosion product formation between the elongated electrical connector and the sacrificial metal helical coil.

Known tie wire configurations include the molding of a sacrificial metal around a steel tie wire and mechanical attachment of the sacrificial metal to a tie wire with bolts or rivets. The present elongated electrical connectors may be wound or wrapped around the anode body providing multiple physical and electrical connection points between the galvanic anode body and the steel reinforcement without the use of bolts, rivets or other mechanical fasteners. The present disclosure overcomes the disadvantages of known tie wire attachment methods by providing, for example, an easily constructed, secure multipoint attachment.

In accordance with certain embodiments, a galvanic anode system is provided in which the anode body is formed from at least two sacrificial metals, which corrode relative to steel, without the provision or use of an impressed current. The anode body may comprise a first helical coil and a second helical coil. The anode body may be at least partially covered by an encasement material. In some embodiments, elongated metal conductors may be connected to the anode body and emanate from the encasement material to electrically connect the anode body to the reinforcing steel embedded in the concrete.

In further illustrative embodiments, a dual action anode assembly or body is provided in which a more electrochemically active sacrificial metal may establish high initial activity to create an alkaline, chloride-free environment in the vicinity of the attached reinforcing steel. This initial stage of high activity may be followed by longer term protection utilizing the less electrochemically active sacrificial metal following consumption or passivation of the first more electrochemically active metal.

In an embodiment, a first sacrificial metal may be attached to a second less electrochemically active sacrificial metal. The first, more active, sacrificial metal may provide an initially higher galvanic current to initiate the anodic reaction. The second, less electrochemically active, sacrificial metal may provide sufficient current to adequately protect the reinforcing steel over a longer period of time. The anode assembly of the present disclosure may comprise combinations of sacrificial metals such as magnesium, zinc, aluminum, alloys thereof and the like.

In accordance with an embodiment, the anode assembly may comprise a first helical coil, comprising a first sacrificial metal, and a second helical coil, comprising a second sacrificial metal. The first and second helical coils may be interleaved with each other so as to occupy approximately the space of a single coil. The helical coil shape increases the surface area of the anode material thereby increasing the efficiency of the anode.

In some embodiments, the anode assembly may comprise a helical coil, comprising a first sacrificial metal, and a second sacrificial metal comprising a solid mass, for example, a slug, washer, cylinder, wire, bar, disk or strip. A first sacrificial metal helical coil may be wound around a second sacrificial metal such that the first sacrificial at least partially surrounds the second sacrificial metal. For example, a zinc helical coil may be wound around a magnesium strip or a zinc wire. One or more elongated electrical connectors may be woven or wrapped around the sacrificial metals.

In an embodiment, a first sacrificial metal helical coil may be placed adjacent to a second sacrificial metal and then wrapped with an elongated steel electrical connector. For example, a zinc helical coil may be positioned adjacent to, and in contact with, a magnesium strip. One or more elongated electrical connectors may be wound or wrapped around in electrical contact with the helical coil and magnesium strip.

In another embodiment, the first sacrificial metal may comprise magnesium. The magnesium reacts rapidly causing an initial polarization intensity and creates an alkaline environment around the steel. This initial polarization forces diffusion of chloride ions away from the steel. As the magnesium is consumed or otherwise expended, the second sacrificial metal, for example zinc, operates to maintain the passive condition of the reinforcing steel. The system may achieve the benefits of impressed current systems without complex wiring, batteries or external power supplies.

According to certain aspects of the present disclosure, the anode surface area is effective to discharge enough current to protect the structure and the anode weight is sufficient to last the desired lifetime when discharging current. The galvanic anode system of the present disclosure is self-regulating based on the incipient corrosion activity of the attached adjacent steel. The corrosion products from the first and/or second sacrificial metals may also act as an electrical or ionic path spacer to optimize charge distribution around the anode.

The corrosion rate depends on temperature, humidity, ionic environment, and conductivity regardless of whether it is corrosion of reinforcing steel or of a sacrificial anode. The material of the sacrificial anode may be chosen to preferentially corrode compared to the steel to provide a protective cathodic charge on the steel. As the corrosion conditions become more favorable, the corrosion rate of the anode increases providing proportionally increased corrosion protection to the steel. In this competing chemical reaction, the preferred reaction may prevent the second from occurring by an induced electrical charge.

An anode may also passivate in service due to increased activity causing oxidation products to deposit faster than, for example, absorption, dissolution, or chelation mechanisms in the encasement material can convey them away. Spacing the anode apart from the steel may reduce the intensity of the protective current and reduce the tendency of the anode to passivate. Oxidation products may deposit on the surface of the sacrificial metal of the anode as it corrodes. If these corrosion products are not removed they will prevent the electrochemical reaction by blocking the flow of ions through the electrolyte, which is known as passivation of the anode. By making the oxidation products soluble, the anode may continue to function as intended. The solubility of the corrosion products is controlled by the encasement material. The encasement material provides a mechanism for removal of the corrosion products from the surface of the sacrificial metals of the anode body, as well as providing an ionic path for ions to flow from the steel reinforcement (the cathode) to the corroding sacrificial metal anode.

In accordance with certain embodiments, an encasement material may comprise, for example, a binders, geopolymers, mortars and the like. Without limitation, and only by way of illustration, the encasement material may comprise a cementitious mortar. Alternatively, the encasement material may comprise an ionically conductive, compressible mortar, wherein the matrix is sufficiently compressible to absorb the products of corrosion of the sacrificial metal anode. The encasement material may be of a suitable activating chemistry, for example, through halides, chelation, or pH; and of sufficient porosity to enable absorption of the products of corrosion, thereby preventing or reducing passivation.

In other embodiments, the encasement material may include humectant, deliquescent and/or hygroscopic materials to absorb sufficient moisture to maintain conductivity around the anode to ensure that sufficient output of current is maintained during the life of the anode and to keep the interface between the anode and cathode (steel reinforcement) electrochemically active.

According to certain illustrative embodiments, a suitable encasement material for the galvanic anode body comprises a mixture of about 75% gypsum, about 20% bentonite clay, and about 5% sodium sulfate. This encasement material provides a uniform environment that reduces self-consumption of the anode. Without being bound to any particular theory, it is thought that the sulfate activates the zinc metal of the anode body and the bentonite clay acts as a humectant.

The sacrificial metal helical coils of the present galvanic protection system are easily fabricated and overcome the difficulties of known anode bodies, for example, those constructed using molten zinc. The fabrication process may be automated utilizing commercially available materials, for example, zinc wire, and automated coil winding production processes. In contrast to known discrete galvanic anode systems, the length of the present anode body comprising at least one helical coil may be extended to any suitable length to accommodate various length requirements based on the intended repair site. Other dimensions of the helical coil may be easily varied on demand and tailored for a specific use.

Aspects of the present disclosure are applicable to repairs where a section of existing concrete is excavated to expose the steel reinforcement and to arrangements which include the galvanic anode assembly and a discrete repair patch.

In certain embodiments, the anode assembly is embedded in the concrete and its installation is compatible with normal construction practices involved in concrete rehabilitation and thus requires no specialized installation training. These procedures may include excavation of damaged concrete down to a depth slightly below the steel reinforcement, attachment of the anode assembly to the steel reinforcement and back filling the excavated concrete area with a suitable embedding or repair mortar.

According to certain illustrative embodiments, the sacrificial anode system of the present disclosure is shaped similar to a short piece of reinforcing steel and may be positioned immediately adjacent to the reinforcing steel. This configuration optimizes the spacing achieved in congested repair areas and allows for a smaller and less costly concrete repair.

According to other illustrative embodiments, a method for reducing the corrosion of steel reinforcement in a concrete structure comprises providing a dual action sacrificial anode assembly of at least two sacrificial metals of different materials, each more electrochemically active than steel. The anode may be at least partially covered in an encasement material. Elongated electrical conductors are connected to the anode body and at least a portion of the electrical connectors emanate from the encasement material. The dual action anode assembly may be inserted into a hole formed in a concrete structure. The encasement material of the anode assembly is placed near the surface of the steel reinforcement. The anode assembly is secured in place by winding the elongated electrical connectors around the steel reinforcement.

The secured anode assembly may be backfilled with suitable materials, such as cementitious repair mortars. The backfill material may comprise a single material or a combination of two or more materials. According to certain embodiments, the cementitious mortar may comprise a low resistivity mortar. Alternatively, a low resistivity mortar may be used to encapsulate the secured anode assembly and then embedded within a high resistivity repair material so long as the low resistivity embedment mortar encapsulates the secured anode assembly and provides an ionically conductive path to the original concrete adjacent to the repair area. By way of example, according to certain illustrative embodiments, the backfill material may include a material to create activation and another material to capture attracted chlorides.

As shown in FIG. 1, the cathodic protection system 100 includes an anode assembly comprising an anode body 102 including a sacrificial metal 110. The sacrificial metal 110 may comprise at least one helical coil having a longitudinal axis. Elongated electrical conductors 116, 118, or tie wires, may be wound around, and in electrical contact with, the sacrificial metal 110. The anode body 102 may be at least partially coated or covered with an encasement material 108. The elongated electrical conductors 116, 118 are connected to the anode body 102 and emanates from the encasement material 108. During installation, the electrical conductors 116, 118 are secured to the reinforcing steel 114 by wrapping the ends of the conductors 116, 118 around the steel reinforcement 114.

Figure 2:
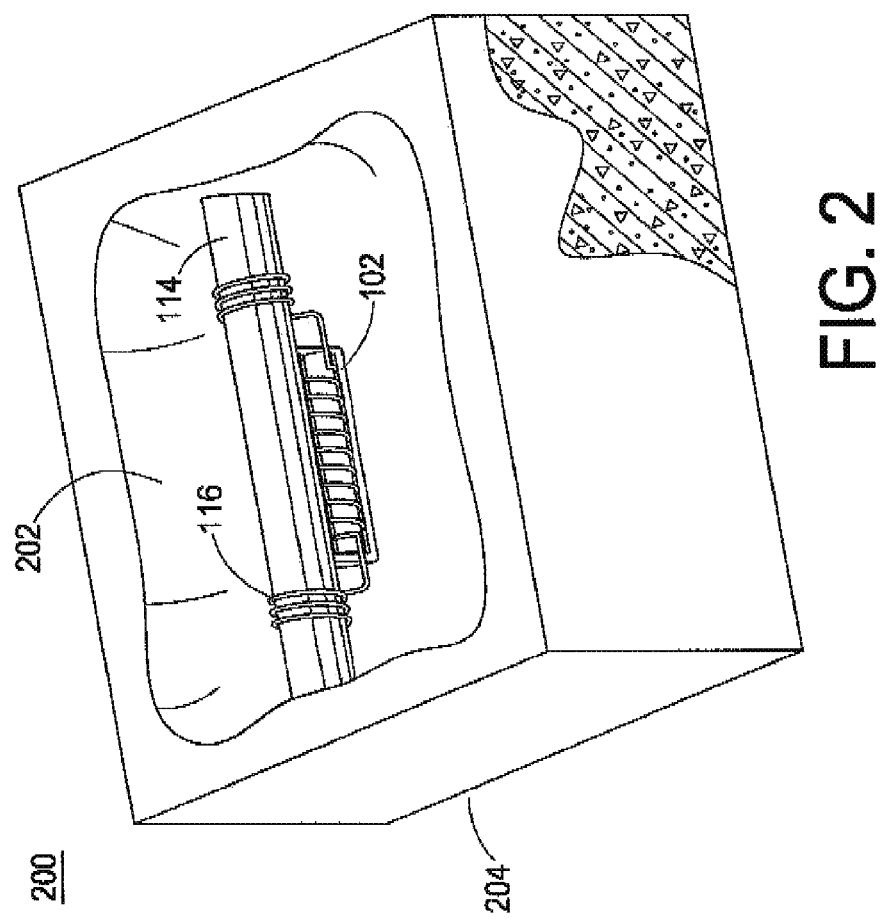
FIG. 2 shows a repair site in a reinforced concrete article with an illustrative embodiment of a sacrificial anode embedded therein.

Turning to FIG. 2, the cathodic protection system 200 comprises forming a repair patch 202 in a steel reinforced concrete structure 204. The anode assembly 102 is secured to the reinforcing steel 114 with elongated electrical conductors 116, 118.

Figure 3A:
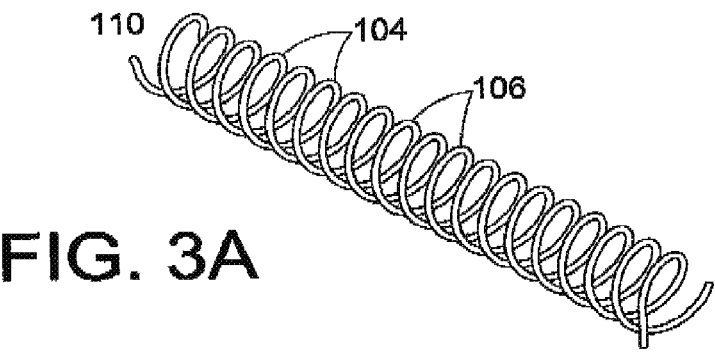
FIG. 3A is a perspective view of an illustrative embodiment of the galvanic anode.

As shown in FIG. 3A, the anode body comprises a sacrificial metal 110 comprising helical coils 104, 106 having a longitudinal axis. The anode body comprises a first helical coil 104 interleaved with a second helical coil 106 as shown. By interleaved it is meant that the first 104 and the second coil 106 are arranged or interspersed alternately. The interleaved coils may be arranged such that the loops, or turns, of one coil 104 fit into the spaces between the loops of the other coil 106. The helical coils 104, 106 may comprise the same sacrificial metal. In an embodiment, helical coil 104 may comprise a less sacrificial metal and helical coil 106 may comprise a more sacrificial metal, or vice-versa. In accordance with an embodiment, the sacrificial metal 110 of the anode body 102 comprises a single helical coil 104 comprising a sacrificial metal or combination of sacrificial metals.

Figure 3B:
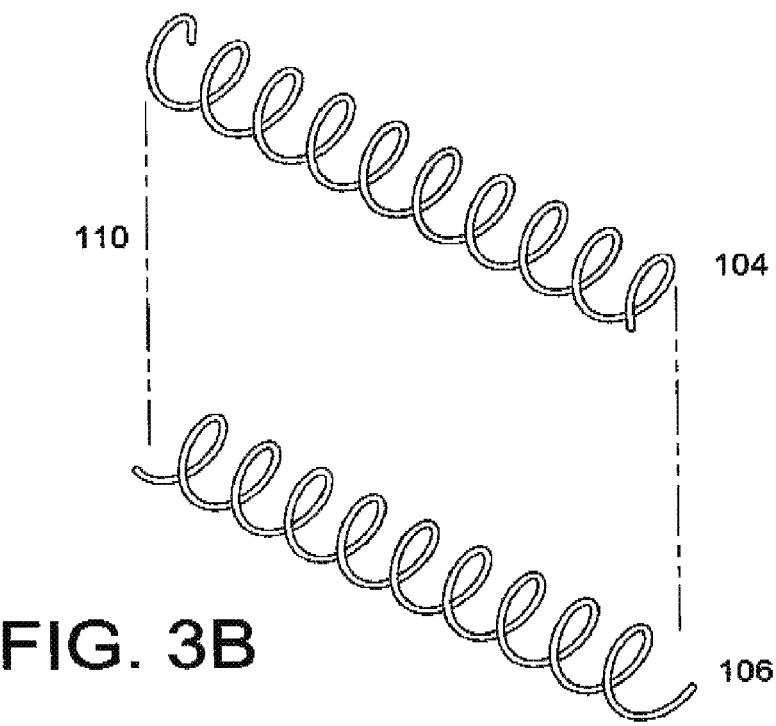
FIG. 3B is an exploded view of an illustrative embodiment of the galvanic anode.

FIG. 3B shows an exploded view of the anode body 110 comprising two different sacrificial metals. The sacrificial metal 110 may comprise helical coils 104, 106 arranged or interspersed alternately or interleaved with each other. At least one elongated electrical conductor, or tie wire, may be wound around, and in electrical contact with, the interleaved coils 104, 106 in order to electrically connect the anode body 110 to the reinforcing steel located in the concrete structure.

Figure 4A:
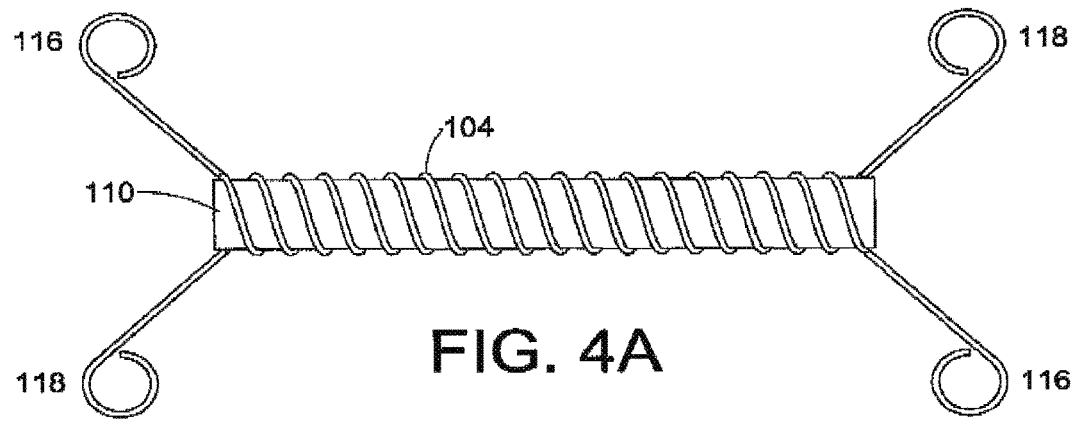
FIG. 4A is a perspective view of an illustrative embodiment of the galvanic anode.
Figure 4B:
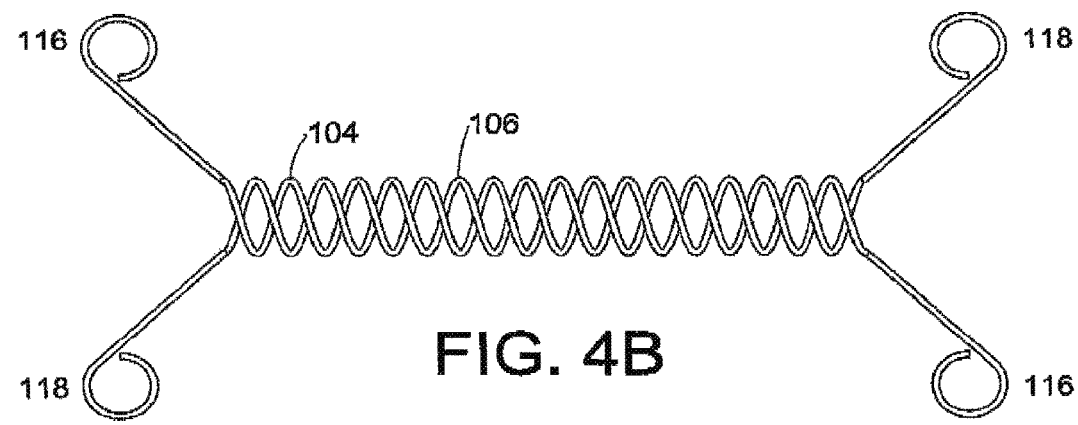
FIG. 4B is a perspective view of an illustrative embodiment of the galvanic anode.
Figure 5:
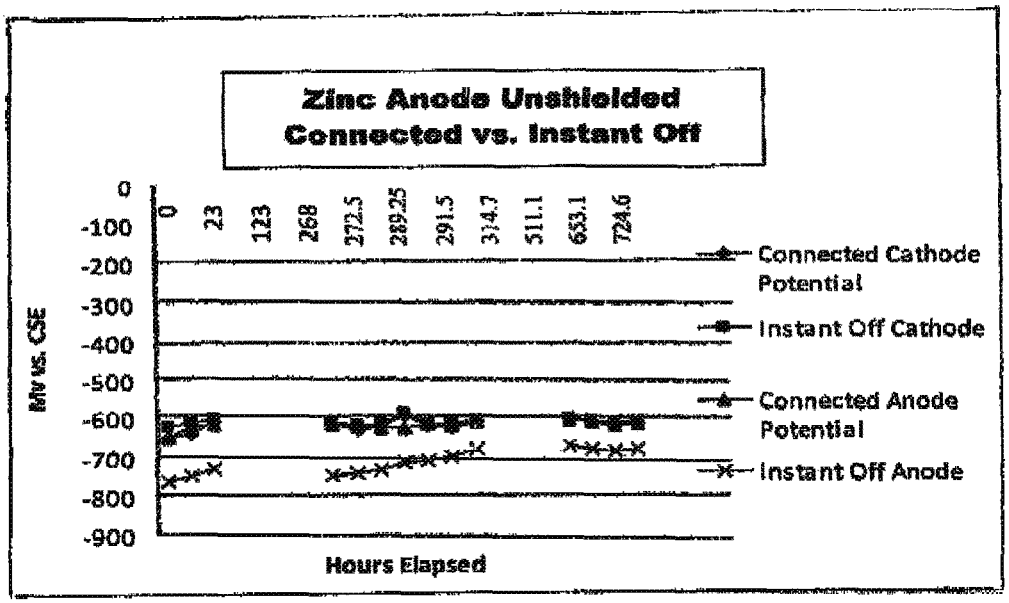
FIG. 5 is a graph depicting the difference between the connected potential and instant-off measurements for an illustrative cathode-anode assembly incorporating the Zinc-unshielded sacrificial anode.
Figure 6:
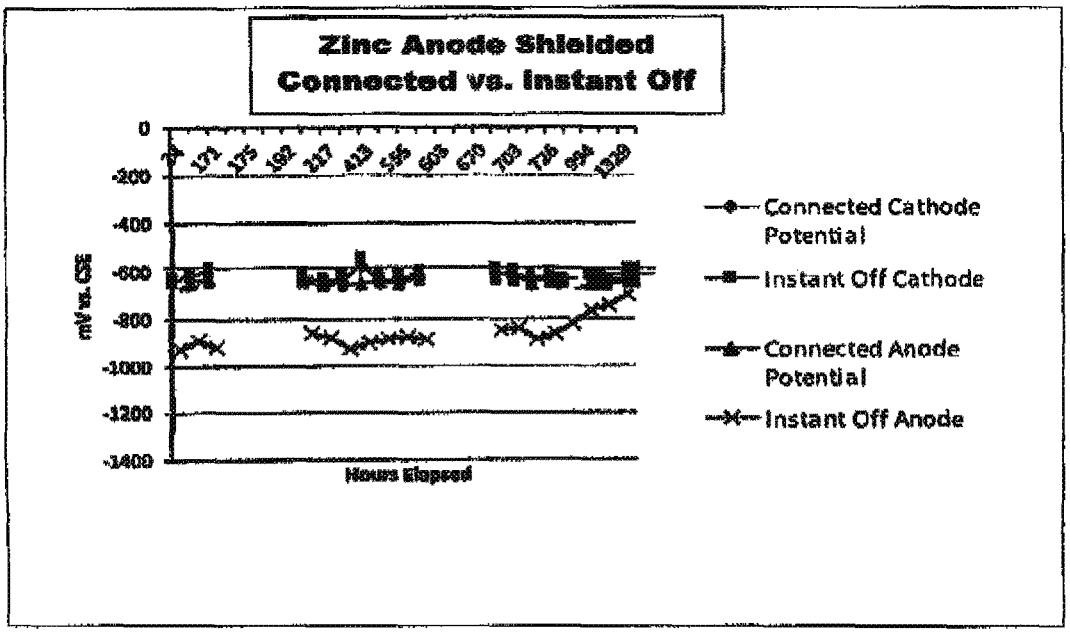
FIG. 6 is a graph depicting the difference between the connected potential and instant-off measurements for an illustrative cathode-anode assembly incorporating the Zinc-shielded sacrificial anode.
Figure 7:
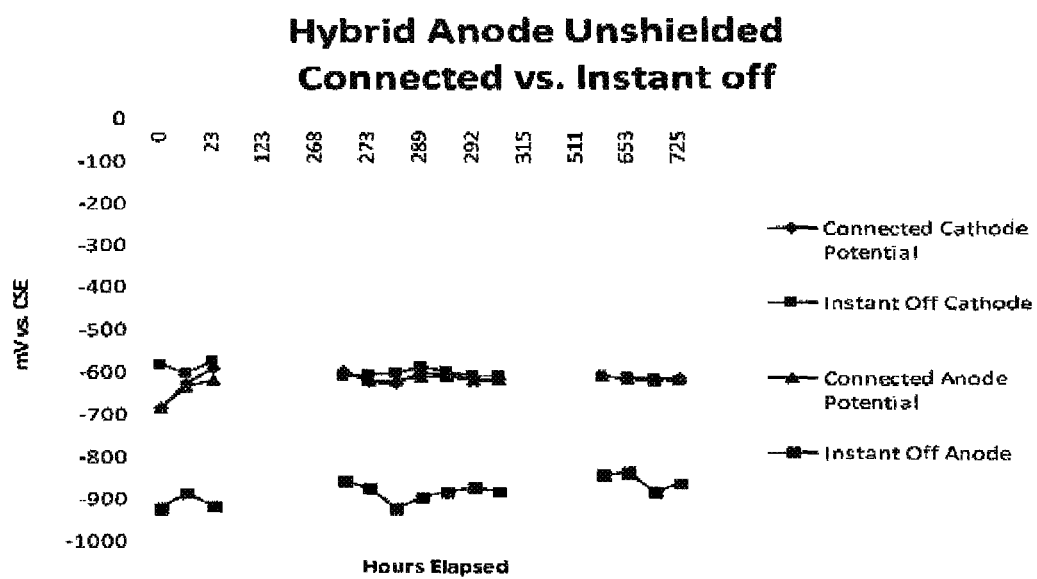
FIG. 7 is a graph depicting the difference between the connected potential and instant-off for an illustrative cathode-anode assembly incorporating the hybrid zinc/magnesium-unshielded sacrificial anode.
Figure 8:
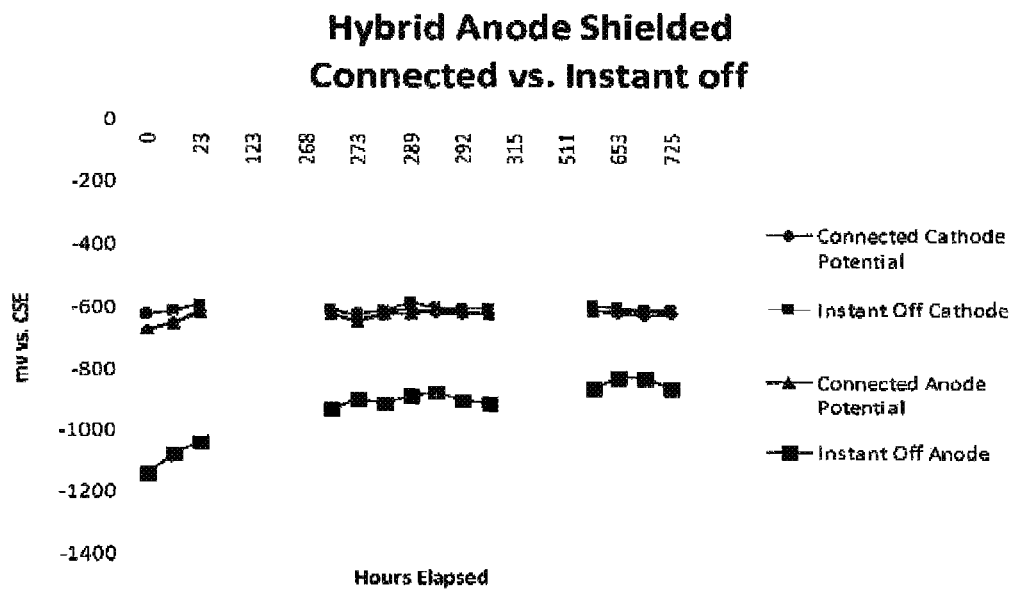
FIG. 8 is a graph depicting the difference between the connected potential and instant-off for an illustrative cathode-anode assembly incorporating the hybrid zinc/magnesium-shielded sacrificial anode.
Figure 9:
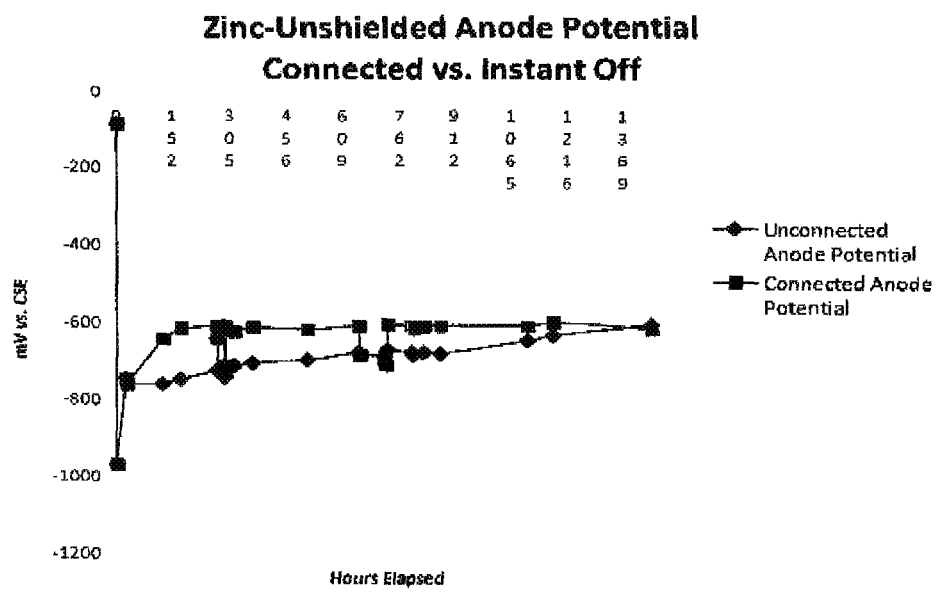
FIG. 9 is a graph depicting the difference between the unconnected and connected anode potential for an illustrative cathode-anode assembly incorporating the Zinc-unshielded sacrificial anode.
Figure 10:
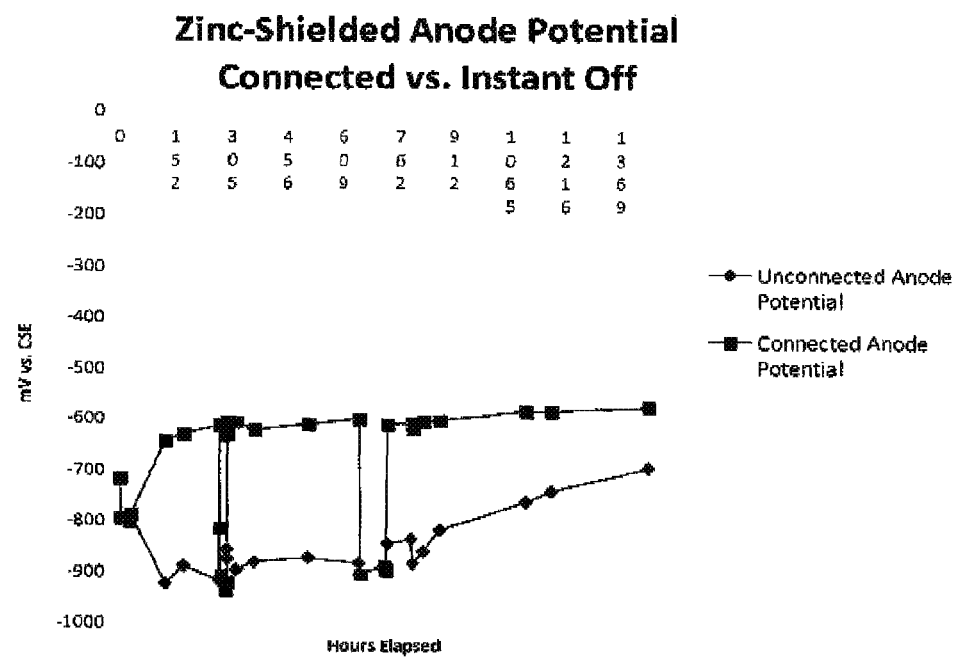
FIG. 10 is a graph depicting the difference between the unconnected and connected anode potential measurements for an illustrative cathode-anode assembly incorporating the Zinc-shielded sacrificial anode.
Figure 11:
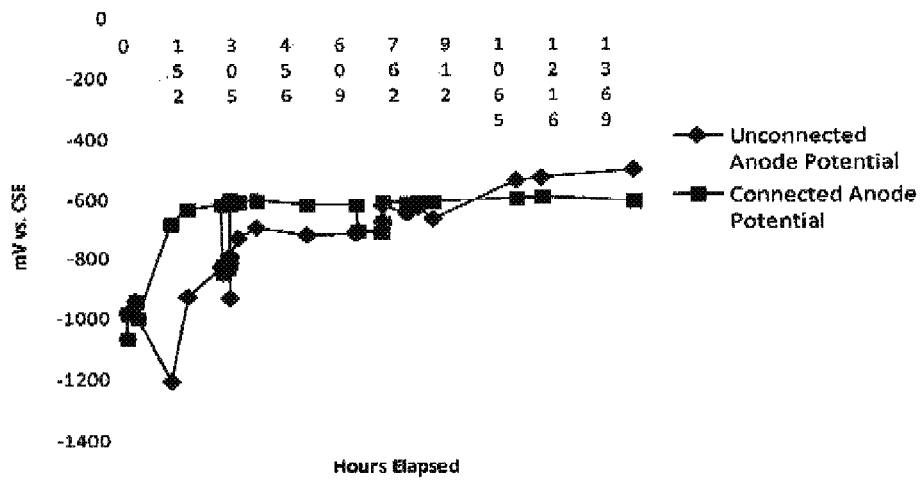
FIG. 11 is a graph depicting the difference between the unconnected and connected anode potential measurements for an illustrative cathode-anode assembly incorporating the hybrid zinc/magnesium-unshielded sacrificial anode.
Figure 12:
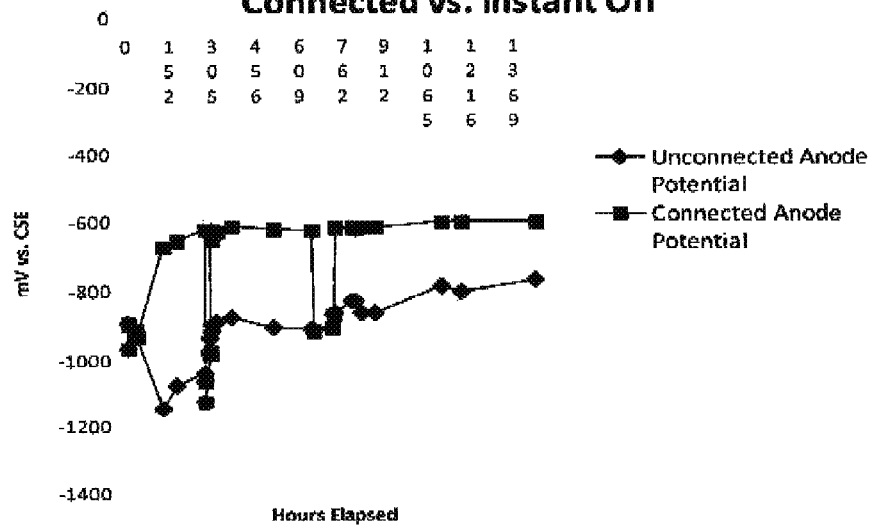
FIG. 12 is a graph depicting the difference between the unconnected and connected anode potential measurements an illustrative cathode-anode assembly incorporating the hybrid zinc/magnesium-shielded sacrificial anode.

As shown in FIGS. 4A and 4B, an illustrative anode body comprises a sacrificial metal 110. The sacrificial metal 110 may comprise helical coil 104 or interleaved coils 104, 106 having a longitudinal axis as shown in FIGS. 3A and 3B. Elongated electrical conductors 116, 118 or tie wires, may be wound around, and in electrical contact with, the sacrificial metal 110 comprising helical coil 104 or the interleaved coils 104, 106.

In further embodiments, the sacrificial metal 110 may comprise a first sacrificial metal helical coil wound around a second sacrificial metal such that the first sacrificial metal helical coil at least partially surrounds the second sacrificial metal. For example, a zinc helical coil may be wound around a magnesium strip or a zinc wire.

In still further embodiments, the sacrificial metal may comprise a first sacrificial metal helical coil adjacent to and substantially co-extensive with a second sacrificial metal. The adjacent and substantially co-extensive first and second sacrificial metals are wrapped with elongated electrical connectors. For example, a zinc helical coil may be positioned adjacent to, and in contact with, a magnesium strip. Elongated steel electrical connectors may be wound or wrapped around in electrical contact with the co-located helical coil and magnesium strip.

The present disclosure overcomes the disadvantages of known galvanic cathodic protection systems as it is easily fabricated and occupies a minimum volume within a steel reinforced concrete structure while providing maximum surface area for sacrificial corrosion. In an embodiment, the use of two sacrificial metals provides both initially higher current for the initial polarization of the reinforcing steel and then a longer lasting lower current to maintain cathodic protection. The initial polarization of the reinforcing steel by the more active metal tends to remove chloride ions and restore alkalinity in the vicinity of the protected reinforcing steel. The second sacrificial metal then merely needs to maintain these passive conditions thereby providing a dual action galvanic protection.

EXPERIMENTAL

Prototype sacrificial galvanic anodes were constructed and cathode-anode assemblies using the prototype galvanic anodes were evaluated for half-cell potential, corrosion current, and resistivity. The construction of the galvanic anodes and the cathode-anode assemblies, and the evaluation methods, are described below. It should be noted that the following description of the anode assemblies, the cathode-anode assemblies, and evaluation methods and results are merely intended to illustrate the disclosed subject matter. The following description of the anode construction, cathode-anode assembly and evaluation method should not be construed as limiting the presently disclosed subject matter in any manner.

Test Container

Five (5) gallon (20 L) plastic pails were used for containing galvanic anode specimens for the evaluations. A filter fabric was placed in the bottom of each plastic pail and a drain hole was drilled into the bottom wall of the plastic pail to permit drainage of simulated concrete pore water solution.

Concrete Pore Solution

The simulated concrete pore solution was prepared from a mixture of

| | |
|---|---|
| 7 kg | cement |
| 31 kg | tap water |
| 1.4 kg | 10% NaCl solution. |

The mixture was blended and allowed to settle. The decanted liquid was filtered and was used as the simulated concrete pore water solution for all of the evaluations of the galvanic anode specimens. The sodium chloride level in the simulated pore solution corresponds to a chloride content of 9 kg NaCl per 2300 kg/m$^3$ concrete. This chloride level was selected as sufficiently severe chloride exposure as might be commonly experienced in the field where reinforcing steel would be corroding.

Steel Screen Cathode

A corrodible steel screen (McMaster-_Carr 9243T381) comprising an extra rigid plain steel wire cloth having ½ inch openings, 0.135 inch wire diameter with a total of 62% open area was selected as the cathode for the evaluations of the galvanic anode. The steel screen was selected based on its high surface area in a small space, and since all of the openings allowed access to all of the surfaces of the screen. The steel screen was cut into 30×30 cm pieces. The sized and cut steel screens were bent to fit into the 5 gallon pail. The steel screen was prepared by sandblasting, pickling in 10% sodium hydroxide solution at 60° C. for 24 hours, followed by rinsing in deionized water and acetone.

Sand

The steel screen cathode is positioned within the specimen container (ie, the plastic pail) and the pail is filled with sand. Sand is a suitable media for evaluating galvanic anodes as it is low cost, remains moist, provides ample oxygen for corrosion to occur, and can be removed for visual examination of the anode specimens.

Electrochemical Cell

A 14 gauge (1.63 mm diameter) solid copper lead wire was attached to the top wire of the steel screen by wrapping, followed by soldering and coating the connection with an epoxy (commercially available from BASF Corporation—Building Systems under the trade name CONCRESIVE 1420). The surface area of the steel screen anode was calculated to be 0.157 $m^2$, which is about ⅙ of the steel area recommended for anode spacing using currently commercially available galvanic anodes (1 anode of 0.0271 $m^2$ zinc surface area per 0.5 $m^2$ of reinforcing steel area or a ratio of 18.4 of steel surface area to zinc surface area). The ratio of steel surface area to zinc surface area is referred to as the cathode to anode ratio. Based on the weight of the steel screen cathode piece of 1241 g, 289,455 coulombs could be released by completed oxidation of to the +3 valence of iron according to Faraday's law.

Test Prototypes

Four prototype galvanic anode core specimens were prepared for evaluation. These consisted of two galvanic anode configurations (zinc metal and hybrid) and two attachment methods (shield and unshielded).

The two zinc metal galvanic anode core specimens were prepared from a 13 inch (333 mm) length of zinc wire having a diameter of 0.125 inch (3.125 mm) that was formed into a coil approximately 15 mm in diameter and 75 mm in length. This galvanic anode core resulted in a cathode to anode ratio of 48.3. The mass of zinc was 18.6 g, corresponding to 54,874 coulombs, and has a surface area of 3,266 $mm^2$.

Each galvanic anode core specimen was wrapped with two oppositely pitched (clockwise and counter-clockwise wrapping spiral) piece of steel tire wire that had been sandblasted, pickled in caustic soda, and washed with acetone in a fashion similar to the preparation of the steel mesh cathode. The electrical connectors were connected to a 14 gauge solid copper lead wire by wrapping, soldering, and epoxy coating the connection that was then used for monitoring the anode polarization and corrosion current in the electrochemical cell. The zinc surface area is about 38% of the recommended cathode to anode ratio based on the spacing of the commercially available BASF EMACO Intact CP 150 anode required for a given reinforcing steel surface area.

One of the zinc galvanic anode core specimens was spaced about 1 mm away from the steel screen cathode by using a nylon zip tie to insulate the anode core from electrical contact with the steel screen cathode. This specimen is designated as Zinc-Unshielded.

Another substantially identical zinc galvanic anode core specimen was insulated from the steel screen cathode by using a 4 cm wide piece of butyl tape and double-sided foam tape to simulate shielding. This specimen is designated as Zinc-Shielded.

Both zinc anode core specimens were attached to the steel screen cathode with nylon zip ties to secure the anode to the cathode steel.

Two additional galvanic anode core specimens were prepared from magnesium and zinc. A coil prepared from a 220 mm length of zinc wire having a diameter of 0.091 inches (2.31 mm) weighing 6.5 g along with 70 mm of straight zinc wire having a diameter of 0.125 inch (3.125 mm) for a total zinc weight of 10.4 g, and a 10×95×1.1 mm magnesium plate weight 2 g. The total zinc surface area was 2288 $mm^2$ and the magnesium surface area was 2148 $mm^2$ for a total surface area of 4435 $mm^2$ and a total anode weight of 12.4 g. This corresponds to 46736 coulombs for the hybrid zinc-magnesium anode (30682 coulombs of zinc and 16054 coulombs of magnesium) and a cathode to anode ratio of 35.5. The zinc surface area is about 50% of the recommended cathode to anode ratio based on the spacing of the commercially available BASF EMACO Intact CP 150 anode required for a given reinforcing steel surface area.

One of the hybrid zinc-magnesium galvanic anode core specimens was spaced about 1 mm away from the steel screen cathode by using a nylon zip tie to insulate the anode core from electrical contact with the steel screen cathode. This specimen is designated as Hybrid-Unshielded.

Another substantially identical hybrid zinc-magnesium galvanic anode core specimen was insulated from the steel screen cathode by using a 4 cm wide piece of butyl tape and double-sided foam tape to simulate shielding. This specimen is designated as Hybrid-Shielded.

Both hybrid zinc-magnesium anode core specimens were attached to the steel screen cathode with nylon zip ties to secure the anode to the cathode steel.

After assembling the four galvanic anode-cathode specimens, they were positioned in assigned plastic pails and the sand was moistened with simulated concrete pore water. For the first 24 hours, the anode and cathode were left unconnected to produce a corrosive environment around the anode-cathode assemblies. The connecting wires from the anode to the cathode were joined and the anode began providing protection to the cathode.

Measurements of half-cell potential vs. copper/copper sulfate reference electrode (CSE) for both the cathode and the anode and the corrosion current were obtained for each specimen. A half-cell potential is required to compare the polarization voltage in a corrosion cell with NACE. The current NACE SP0169-2007 Section 61 emphasizes three cathodic protection (CP) criteria, namely, (1) −850 mV vs. saturated copper/copper sulfate electrode with CP current applied, or −850 mV on-potential considering voltage drops (IR), (2) −850 mV off-potential or polarized potential, and (3) 100 mV polarization.

The objective of the evaluation was to achieve partial protection of the steel screen cathode to force the output of the anodes through an unfavorable anode to cathode ratio in an environment susceptible to corrosion (ie, room temperature, high humidity, and presence of chlorides above the chloride corrosion threshold level). In addition to the half-cell potential and corrosion current measurements, the temperature, pH and resistivity of each cathode-anode specimen was measured. Because corrosion is an electrochemical reaction, increasing the temperature will increase the rate of the reaction, in this case the corrosion current. The pH was monitored to assure that the cathode-anode specimens remained alkaline to simulate the normal conditions present when embedded in repair concrete. The resistivity was measured to assure that sufficient moisture was present for corrosion to occur in the system.

Evaluation Results

Anode Potential

All four cathode-anode assembly specimens were evaluated for over 56 days. A measured difference between the instant off and connected potential of >100 mV indicates adequate function of the sacrificial anode. A lack of difference between the instant off and connected values from the cathode indicates that the intended unfavorable cathode to anode surface area is not permitting sufficient protection to be provided to the cathode by preferential corrosion of the sacrificial anode. The results of these measurements are plotted on the graphs shown in FIGS. 5-8.

FIGS. 8-12 are graphs depicting the connected and instant off anode potential for each test specimen. A larger difference between the measured potentials indicates a higher anode output. The gaps where the two lines merge on the graph are depolarizations, where the anode and cathode were left unconnected for some period of time to gauge recovery of the anode during an off cycle, such as would occur in freezing or drying conditions in field installations. As shown in the graphs all four prototype sacrificial anodes (zinc-unshielded, zinc shielded, hybrid zinc/magnesium-unshielded, hybrid zinc/magnesium shielded) demonstrated differences between connected and unconnected anode potential suitable to provide protection to the steel screen anode. It is noted that the shield embodiments of the zinc and hybrid zinc/magnesium anodes demonstrated a larger difference between the unconnected and connected anode potential.

Figure 13:
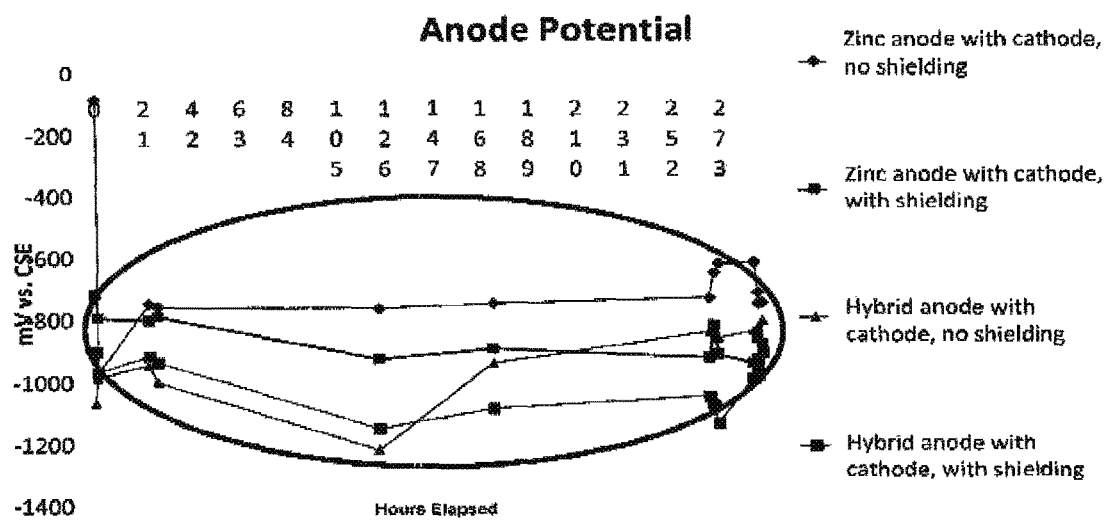
FIG. 13 is a graph depicting a comparison if the anode potentials between the anode specimens with a shortened time scale.

FIG. 13 shows a comparison of the anode potentials of the zinc-unshielded, zinc shielded, hybrid zinc/magnesium-unshielded, hybrid zinc/magnesium shielded prototype sacrificial anode with a shortened time scale.

Corrosion Current

Figure 14:
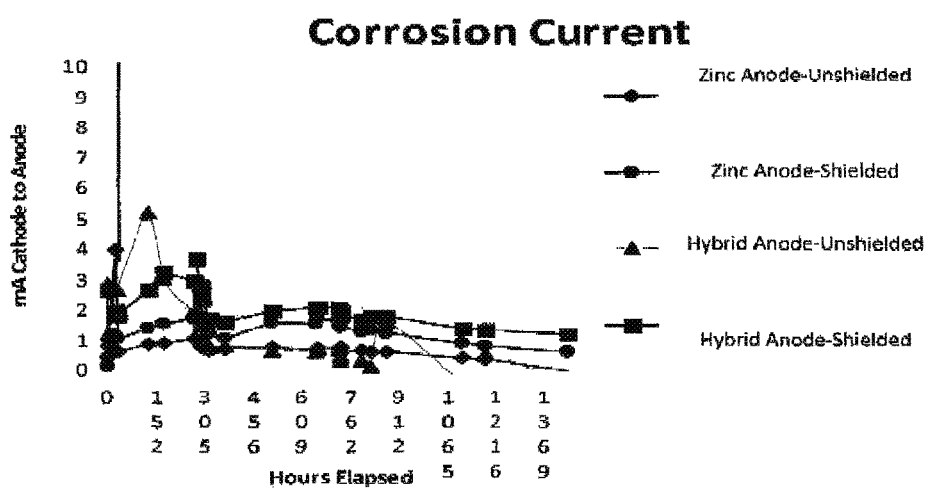
FIG. 14 is a graph depicting a comparison of the corrosion currents for the prototype sacrificial anodes evaluated.
Figure 15:
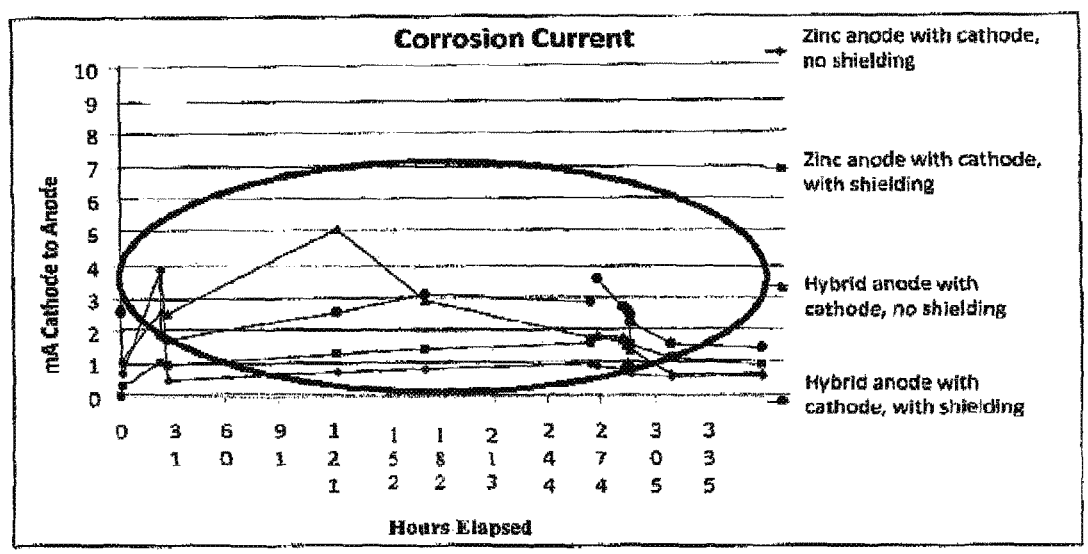
FIG. 15 is a graph depicting a comparison of the corrosion currents for the prototype sacrificial anodes evaluated with a shortened time scale.

The corrosion current is another measure of anode output and is a function of the rate of the galvanic metal consumption. When the corrosion current approaches zero, then anode has ceased to function either from consumption of the sacrificial metal, passivation (e.g., by the development of an insoluble film of oxidation product on the surface of the sacrificial metal or by the oxidation product creating a short circuit between the anode and the cathode). The graph of FIG. 14 shows the corrosion current measurements for the zinc-unshielded, zinc-shielded, hybrid zinc/magnesium-unshielded, hybrid zinc/magnesium shielded prototype sacrificial anodes. FIG. 15 shows additional initial current provided by the sacrificial magnesium from the hybrid zinc/magnesium anodes over a shortened period of time. It is noted that the hybrid zinc/magnesium-shielded anode exhibits a slightly lower current, but for a longer duration that the hybrid zinc/magnesium—unshielded anode.

While the anode assembly, cathodic protection system and method have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the cathodic protection system and method should not be limited to any single embodiment, but rather construed in breadth and scope in accordance with the recitation of the appended claims.

The invention claimed is:

1. A galvanic anode comprising:
   an anode body comprising at least one helical coil comprising a sacrificial metal and a longitudinal axis;
   at least one elongated electrical conductor electrically connected to at least one said helical coil, wherein said at least one elongated electrical conductor is helically wound around at least a portion of said longitudinal axis of said at least one helical coil, wherein said at least one elongated electrical conductor provides multiple connection points to said anode body; and
   an encasement material surrounding at least a portion of said at least one helical coil and optionally a portion of said at least one elongated electrical conductor.

2. The galvanic anode of claim 1, wherein said sacrificial metal is more electrochemically active than steel.

3. The galvanic anode of claim 2, wherein said sacrificial metal comprises magnesium, zinc, aluminum, and/or alloys thereof.

4. The galvanic anode of claim 1, wherein said sacrificial metal comprises an electromotive metal or metal alloy.

5. The galvanic anode of claim 1, further comprising a shielding adjacent the outer surface of said at least one helical coil.

6. A galvanic anode comprising:
   an anode body comprising a helical coil comprising a first sacrificial metal and a longitudinal axis;
   a second sacrificial metal, said second sacrificial metal is less electrochemically active than said first sacrificial metal, wherein said first sacrificial metal and said second sacrificial metal are more electrochemically active than steel;
   at least one elongated electrical conductor electrically connected to at least one of said first and second sacrificial metals, wherein said at least one elongated electrical conductor is helically wound around at least a portion of said longitudinal axis of said helical coil, wherein said at least one elongated electrical conductor provides multiple connection points to said anode body; and
   an encasement material surrounding at least a portion of said first and second sacrificial metals.

7. The galvanic anode of claim 6, wherein said second sacrificial metal comprises a second helical coil having a longitudinal axis.

8. The galvanic anode of claim 7, wherein said helical coil is interleaved with said second helical coil.

9. The galvanic anode of claim 8, wherein said at least one elongated electrical conductor is helically wound around at least a portion of said longitudinal axis of said second helical coil.

10. The galvanic anode of claim 8, further comprising a shielding adjacent the outer surfaces of the interleaved helical coils.

11. The galvanic anode of claim 6, wherein said second sacrificial metal comprises a solid mass having a longitudinal axis positioned in adjacent contact with the outer surface of said helical coil.

12. The galvanic anode of claim 11, wherein said electrical connector is wound around at least a portion of the longitudinal axis of said helical coil and said solid mass to secure said solid mass to said helical coil.

13. The galvanic anode of claim 6, wherein said first sacrificial metal comprises magnesium or a magnesium alloy.

14. The galvanic anode of claim 6, wherein said second sacrificial metal comprises zinc or a zinc alloy.

15. The galvanic anode of claim 6, wherein said first sacrificial metal comprises magnesium or a magnesium alloy and said second sacrificial metal comprises zinc or a zinc alloy.

16. The galvanic anode of claim 12, wherein said first sacrificial metal is interleaved with said second sacrificial metal, further comprising a shielding adjacent the outer surfaces of the interleaved first sacrificial metal and second sacrificial metal.

17. A system for reducing the corrosion of steel reinforcement in a concrete structure comprising:
an anode body comprising a first helical coil having a longitudinal axis, said helical coil comprising a sacrificial metal more electrochemically active than steel;
at least one elongated electrical conductor electrically connecting said anode to a reinforcing steel element, wherein said at least one elongated electrical conductor provides multiple connection points to said anode body;
an encasement material surrounding at least a portion of said sacrificial metal; and
wherein said at least one elongated electrical conductor is helically wound around at least a portion of said first helical coil.

18. The system for reducing the corrosion of steel reinforcement in a concrete structure of claim 17, wherein said first sacrificial metal comprises magnesium, zinc and/or alloys thereof.

19. The system for reducing the corrosion of steel reinforcement in a concrete structure of claim 17, wherein said encasement material is a porous mortar.

20. The system for reducing the corrosion of steel reinforcement in a concrete structure of claim 17, further comprising a second helical coil comprising a second sacrificial metal, said second sacrificial metal is less electrochemically active than said first sacrificial metal, wherein said second sacrificial metal is more electrochemically active than steel.

21. The system for reducing the corrosion of steel reinforcement in a concrete structure of claim 20, wherein said first helical coil is interleaved with said second helical coil.

22. The system for reducing the corrosion of steel reinforcement in a concrete structure of claim 21, wherein said at least one elongated electrical conductor is helically wound around at least a portion of said longitudinal axis of said first and second helical coils.

23. The system for reducing the corrosion of steel reinforcement in a concrete structure of claim 22, further comprising an insulating spacer adjacent the outer surfaces of the interleaved helical coils.

24. The system for reducing the corrosion of steel reinforcement in a concrete structure of claim 17, further comprising a solid mass of a second sacrificial metal, said second sacrificial metal is less electrochemically active than said first sacrificial metal, wherein said first sacrificial metal and said second sacrificial metal are more electrochemically active than steel.

25. The system for reducing the corrosion of steel reinforcement in a concrete structure of claim 24, wherein said first sacrificial metal comprises magnesium or a magnesium alloy.

26. The system for reducing the corrosion of steel reinforcement in a concrete structure of claim 24, wherein said second sacrificial metal comprises zinc or a zinc alloy.

27. The system for reducing the corrosion of steel reinforcement in a concrete structure of claim 24, wherein said first sacrificial metal comprises magnesium or a magnesium alloy and said second sacrificial metal comprises zinc or a zinc alloy.

28. The system for reducing the corrosion of steel reinforcement in a concrete structure of claim 27, further comprising an insulating spacer adjacent the outer surface of the solid mass of said second sacrificial metal.

29. A method for reducing the corrosion of steel reinforcement in a concrete structure comprising:
electrically connecting the galvanic anode of claim 1 to the steel reinforcement in a steel reinforced concrete structure.

30. The method for reducing the corrosion of steel reinforcement in a concrete structure of claim 29, further comprising:
inserting said galvanic anode into a hole formed in said concrete structure.

31. The method of reducing the corrosion of steel reinforcement in a concrete structure of claim 30, further comprising:
positioning said galvanic anode in proximity to said steel reinforcement.

32. The method of reducing the corrosion of steel reinforcement in a concrete structure of claim 29, wherein said galvanic anode further comprises a second sacrificial metal less electrochemically active than said sacrificial metal.

33. The method of reducing the corrosion of steel reinforcement in a concrete structure of claim 29, wherein said at least one helical coil comprises a first helical coil comprising a first sacrificial metal and a second helical coil comprising a second sacrificial metal, said second sacrificial metal less electrochemically active than said first sacrificial metal, and wherein said first sacrificial metal and said second sacrificial metal are more electrochemically active than steel.

34. The method of reducing the corrosion of steel reinforcement in a concrete structure of claim 33, wherein said first sacrificial metal and said second sacrificial metal comprise electromotive metals or metal alloys.

35. The method of reducing the corrosion of steel reinforcement in a concrete structure of claim 34, wherein said electromotive metals comprise at least one metal selected from the group consisting of lithium, potassium, calcium, sodium, magnesium, aluminum, zinc, chromium, and combinations or alloys thereof.

36. The method of reducing the corrosion of steel reinforcement in a concrete structure of claim 35, further comprising:
wherein either said first sacrificial metal or said second sacrificial metal is magenium in an effective amount to cause migration of chloride ions away from said steel reinforcement of said concrete structure.

* * * * *